United States Patent [19]
Kadota et al.

[11] Patent Number: 6,031,512
[45] Date of Patent: Feb. 29, 2000

[54] COLOR FILTER STRUCTURE FOR COLOR DISPLAY DEVICE

[75] Inventors: Hisashi Kadota; Toshihiko Iwanaga, both of Kanagawa, Japan

[73] Assignee: Sony Corporation, Tokyo, Japan

[21] Appl. No.: 09/106,494

[22] Filed: Jun. 29, 1998

[30] Foreign Application Priority Data

Jun. 30, 1997 [JP] Japan ................................. 9-174458

[51] Int. Cl.[7] ................................................ G09G 3/36
[52] U.S. Cl. ................................ 345/88; 349/43; 349/155
[58] Field of Search .............................. 345/88, 72, 92; 349/155, 43

[56] References Cited

U.S. PATENT DOCUMENTS

| | | | |
|---|---|---|---|
| 5,585,951 | 12/1996 | Noda et al. | 349/122 |
| 5,600,344 | 2/1997 | Sono et al. | 345/87 |
| 5,798,805 | 8/1998 | Ooi et al. | 349/10 |
| 5,818,550 | 10/1998 | Kadota et al. | 349/43 |
| 5,838,411 | 11/1998 | Hayakawa et al. | 349/139 |
| 5,877,832 | 3/1999 | Shimada | 349/138 |

*Primary Examiner*—Steven J. Saras
*Assistant Examiner*—John G. Lim
*Attorney, Agent, or Firm*—Hill & Simpson

[57] ABSTRACT

The present invention provides a color display device in which the shape of an on-chip color filter pattern is improved to remove differences in height on the surface of a driving substrate. In the color display device, normal color filters are formed in alignment with pixel apertures, and a dummy color filter is formed in the spaces between the respective color filters apart from contact holes. Differences in height between the color filters and the spaces between the respective color filters are removed to obtain a color display device having excellent quality of liquid crystal alignment.

8 Claims, 8 Drawing Sheets

COLOR FILTER STRUCTURE FOR COLOR DISPLAY DEVICE

BACKGROUND OF THE INVENTION

1. Field of the Invention

The present invention relates to a color display device such as a liquid crystal display device or the like, and particularly to improvement in the shape of a color filter pattern having an on-chip color filter structure in which color filters are formed on a driving substrate.

2. Description of the Related Art

There have recently been active developments of a color liquid crystal display using a thin film transistor as a switching element for driving each of pixel electrodes. As such a color liquid crystal display device, for example, the construction shown in FIG. 5 is known. In this conventional example, thin film transistors (abbreviated to "TFTs" hereinafter) for respectively driving pixel electrodes 1 are integrated on a driving circuit 20 made of glass, quartz, or the like. A TFT comprises a channel layer comprising a semiconductor thin film 2, which forms an element region, and a gate electrode 3 formed by patterning through a gate insulating film. The semiconductor thin film 2 has a source region S and a drain region D.

The TFT having the above construction is coated with a first interlayer insulating film 4 on which a signal line-side source electrode 6 is provided by patterning to a predetermined shape. The source electrode 6 is coated with a second interlayer insulating film 5 on which a light shielding film 7 also serving as a pixel electrode-side drain electrode is provided. Each of the pixel electrodes 1 is electrically connected to the drain region D through a contact hole CON formed in the first and second interlayer insulating film 4 and 5.

On the TFTs are formed color filters 8, 9 and 10 for coloring the pixel electrodes 1 to generate the primary colors R, G and B, respectively. Each of the color filters 8, 9 and 10 is segmented and interposed between each of the pixel electrodes 1 and the second interlayer insulating film 5. On the color filters 8, 9 and 10 is formed a planarization film 11 according to demand.

In this way, the color filters 8, 9 and 10 are formed directly on the driving substrate 20 to form a so-called on-chip color filter structure. To the driving substrate 20 is bonded a counter substrate 12 with a predetermined space therebetween. On the inner surface of the counter substrate 12 is formed a counter electrode 13 with a liquid crystal 14 sandwiched between both substrates.

The on-chip color filter structure has various advantages as compared with a structure in which color filters are formed on the counter substrate 12. For example, since the color filters 8, 9 and 10 are overlapped with the pixel electrodes 1, no parallax occurs therebetween, and a high aperture ratio of the pixel region can be obtained. Also, since there is substantially no error in alignment between the pixel electrodes 1 and the color filters 8, 9 and 10, a high aperture ratio can be maintained even if the pixel region is made fine.

FIG. 6 is a schematic plan view of the on-chip color filter structure shown in FIG. 5. The color filter 9 (as an example) shown in FIG. 6 is formed in regions respectively including apertures 16 formed between adjacent light shielding regions 15 and extending to the contact holes CON (refer to FIG. 5) respectively formed between the TFTs and the pixel electrodes 1.

A color filter is generally formed by using a color resist composed of an organic photosensitive material containing a pigment dispersed therein. This color resist contains the pigment dispersed therein and having some particle size, and thus has a problem of resolution, thereby causing difficulties in precisely etching the fine contact holes CON. Namely, the residual color resist remains in the contact holes CON, and possibly causes poor contact.

In order to solve this problem, the inventors developed a method of forming color filters apart from the contact holes CON and disclosed it in Japanese Unexamined Patent Publication No. 8-179376. An example of prior applications is described again with reference to FIG. 7. On the second interlayer insulating film 5 formed as described above are formed the color filters 8, 9 and 10 for the primary colors R, G and B, respectively. Each of the color filters 8, 9 and 10 is segmented and formed apart from the contact holes CON formed in the first and second interlayer insulating films 4 and 5. On the color filters 8, 9 and 10 is formed the planarization film 11 as occasion demands. To the driving substrate 20 is bonded the counter substrate 12 with the predetermined space therebetween. On the inner surface of the counter substrate 12 is formed the counter electrode 13, with the liquid crystal 14 sandwiched between both substrates.

FIG. 8 is a schematic plan view of the on-chip color filter structure shown in FIG. 7. The color filter 9 (as an example) shown in FIG. 8 is formed in alignment with the pixel apertures 16 apart from the contact holes CON. This can eliminates the possibility of poor contact due to the residual color resist in the contact holes CON.

However, in the on-chip color filter structure shown in FIG. 7, since the color filters are formed to be higher than the TFT region, differences in height occur between the color filters and the spaces A between the respective color filters in the example of prior applications in which the spaces A are wide as shown in a plan view of FIG. 8. Namely, unevenness occurs on the surface of the driving substrate, and causes difficulties in achieving sufficient planarization even by providing the planarization film. The occurrence of differences in height on the driving substrate in the sectional direction thereof causes disorder in alignment of the liquid crystal, a reverse tilt domain, or the like, thereby possibly causing deterioration in image quality.

SUMMARY OF THE INVENTION

The present invention has been achieved in consideration of the above problems, and an object of the invention is to provide a display device having an on-chip color filter structure in which color filters are formed on a driving substrate, particularly a color display device in which the shape of an on-chip color filter pattern formed in alignment with pixel apertures is improved to remove unevenness on the surface of the driving substrate and improve the quality of liquid crystal alignment.

In order to achieve the above object of the present invention, in accordance with a first aspect of the invention, there is provided a color display device having a so-called on-chip color filter structure comprising a first substrate having a plurality of pixel electrodes arranged in a matrix, switching elements respectively connected to the pixel electrodes, an insulating film arranged between the pixel electrodes and the switching elements and having contact holes for respectively connecting the pixel electrodes and the switching elements, color filters formed in alignment with the pixel electrodes on the first substrate, a dummy color filter formed in the space regions between the adjacent color filters in the plane thereof apart from the contact holes, a second substrate arranged opposite to the first substrate, and an electro-optical material sandwiched between the first and second substrates.

In accordance with a second aspect of the present invention, a color display device comprises a first substrate having a plurality of pixel electrodes arranged in a matrix, switching elements respectively connected to the pixel electrodes, an insulating film arranged between the pixel electrodes and the switching elements and having contact holes for respectively connecting the pixel electrodes and the switching elements, color filters formed in alignment with the pixel electrodes on the first substrate to project in either of concave and convex shapes into the spaces between the adjacent color filters apart from the contact holes; a second substrate arranged opposite to the first substrate; and an electro-optical material sandwiched between the first and second substrates.

The color display device of the present invention comprises the color filters having the so-called on-chip color filter structure in which the dummy color filter is formed in the spaces between the adjacent color filters in the plane thereof, i.e., in the spaces between the pixel apertures, or the color filters are arranged to project into the spaces between the respective pixel apertures apart from the contact holes. Therefore, a driving substrate structure is obtained in which unevenness on the surface of the driving substrate on which the color filters are formed is removed to improve the alignment quality of the liquid crystal.

BRIEF DESCRIPTION OF THE DRAWINGS

FIGS. 4A and 4B is a schematic plan view of a color display device in accordance with a third embodiment of the invention in which FIG. 4A shows an example of concave color filers, and FIG. 4B shows an example of convex color filters;

DESCRIPTION OF THE PREFERRED EMBODIMENT

Figure 1:
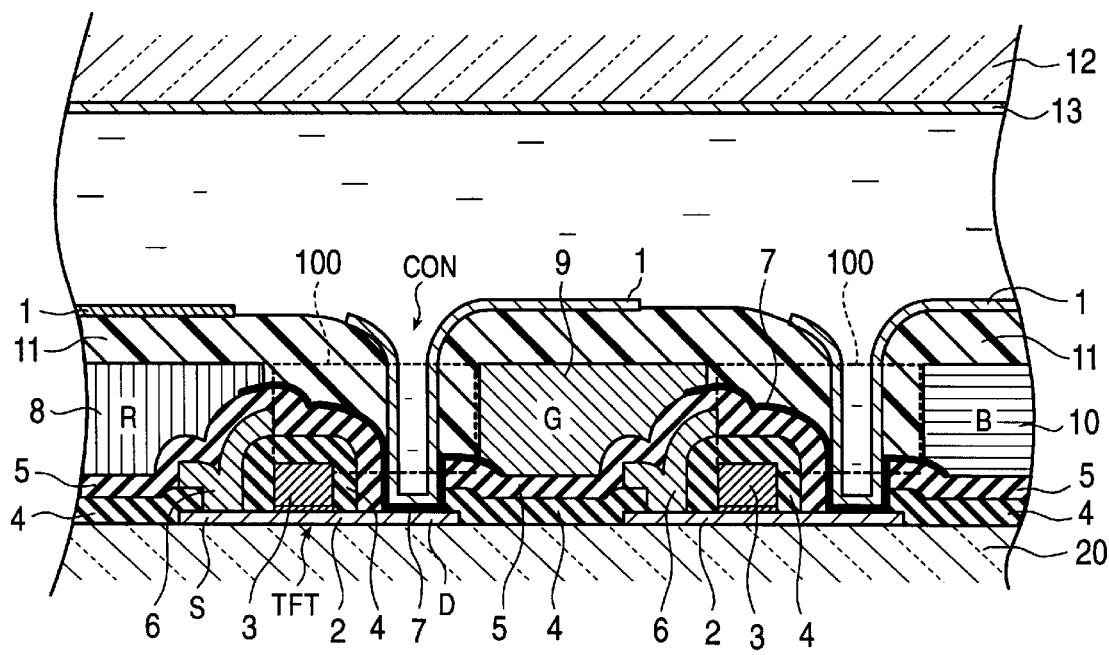
FIG. 1 is a schematic sectional view of a color display device in accordance with a first embodiment of the present invention.

Embodiments of the present invention are described below with reference to the attached drawings.
First Embodiment A color display device in accordance with a first embodiment of the present invention is described in the order of the production steps with reference to FIG. 1. FIG. 1 is a schematic sectional view of a color display device in accordance with the first embodiment. The same portions as the conventional display device are denoted by the same reference numerals, and description thereof is partially omitted.

First, the semiconductor film 2, which constitutes TFTs, is formed to a thickness of 50 to 150 nm on the driving substrate 20 made of glass or the like, for example, by depositing polycrystalline silicon. If required, $Si^+$ ions are implanted to make the thin film 2 non-crystal, followed by heat treatment at about 600° C. or annealing with an excimer laser or the like to increase the grain size. After the semiconductor thin film 2 is patterned to a predetermined shape, a gate insulating film is deposited to a thickness of 10 to 100 nm by means such as thermal oxidation or LPCVD.

Next, polycrystalline silicon or a metal such as MoSi, WSi, Al, Ta, Mo/Ta, Mo, W, Ti, Cr, or the like is deposited and then patterned to form the gate electrodes 3. In the use of polycrystalline silicon for the gate electrodes 3, the step of thermally diffusing $P^+$ ions or the like is carried out to decrease resistance. Then, impurities ions are implanted by ion implantation or ion doping using the gate electrodes 3 as a mask to form source regions S and drain regions D.

Then, PSG, NSG, or the like is deposited to a thickness of 400 to 800 nm by atmospheric pressure CVD to form the first interlayer insulating film 4. In the first interlayer insulating film 4 are formed the contact holes respectively communicating with the source region S and the drain regions D. Then, a conductive thin film made of Al or the like is deposited to a thickness of 300 to 700 nm. The conductive thin film is patterned to a predetermined shape to form the source electrodes 6. On the source electrodes 6 is formed to a thickness of 300 to 700 nm PSG or the like by atmospheric pressure CVD to form the second interlayer insulating film 5.

Then, the contact holes CON for electrical contact with the pixel electrodes 1 are formed in the first and second interlayer insulating films 4 and 5. On these films is deposited to a thickness of about 50 to 1000 nm a metal such as Ti, Al, Mo, Cr, W or TiNx, or a silicide thereof by sputtering or the like to form a metallic thin film as the light shielding film 7 which also serves as a black mask, followed by patterning to a predetermined shape.

On the light shielding film 7 is coated to about 0.5 to 3.0 μm a color resist comprising an organic photosensitive material containing a pigment dispersed therein, for example, PIC produced by Nissan Chemical Co., Ltd., V-259-R, G, B (trade made) produced by Shin-Nittetsu Chemical Co., Ltd. to form the segments of each of the color filters 8 (R), 9 (G) and 10 (B), and a dummy color filter 100. In this step, a total of three times of the step comprising exposure, development, and burning are carried out by using different color resists for the respective primary colors R, G and B to form the color filters. The dummy color filter 100 may be formed by using a photosensitive material in which a dye is dissolved, or any one of the color resists of R, G and B.

On the color filters is coated to a thickness of about 1.0 to 3.0 μm an organic transparent material, for example, OFPR8600 produced by Tokyo Ohka Co., Ltd., V-259PA (trade name) produced by Shin-Nittetsu Chemical Co., Ltd., or the like by spin coating to form the planarization film 11. In the planarization film 11 are formed contact holes for contact with the pixel electrodes 1, and a transparent conductive film of ITO (Indium-Tin Oxide) or the like is deposited to a thickness of 50 to 200 nm by a sputtering process, and then patterned to the pixel pattern to form the pixel electrodes 1. Then, an alignment film of polyimide or the like is coated, and then rubbed. Then, the liquid crystal 14 is injected and sealed between the driving substrate 20 and the counter substrate 12 provided with a counter electrode 13 processed in the same manner to complete the color display device of the present invention.

Figure 2:
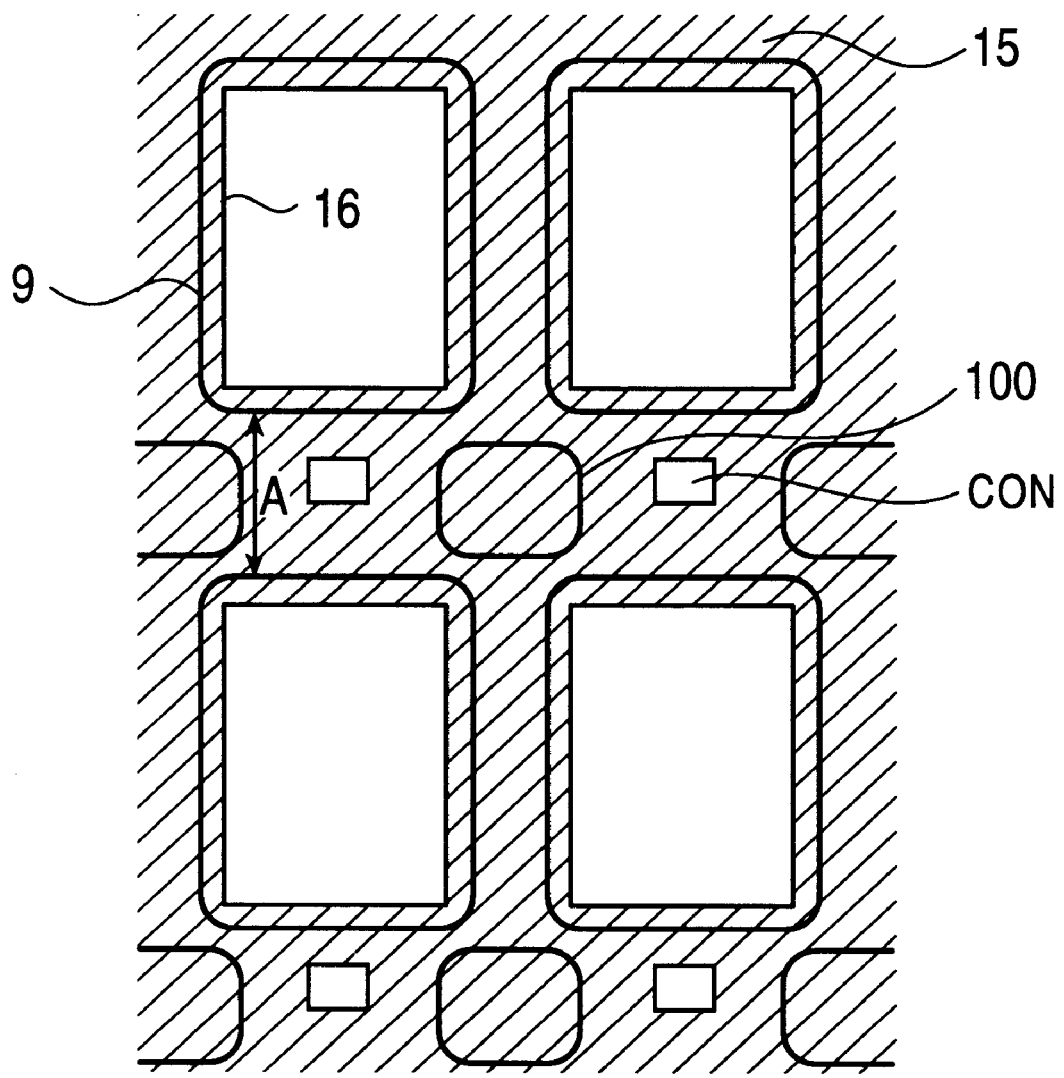
FIG. 2 is a schematic plan view of the color display device in accordance with the first embodiment shown in FIG. 2.
Figure 6:
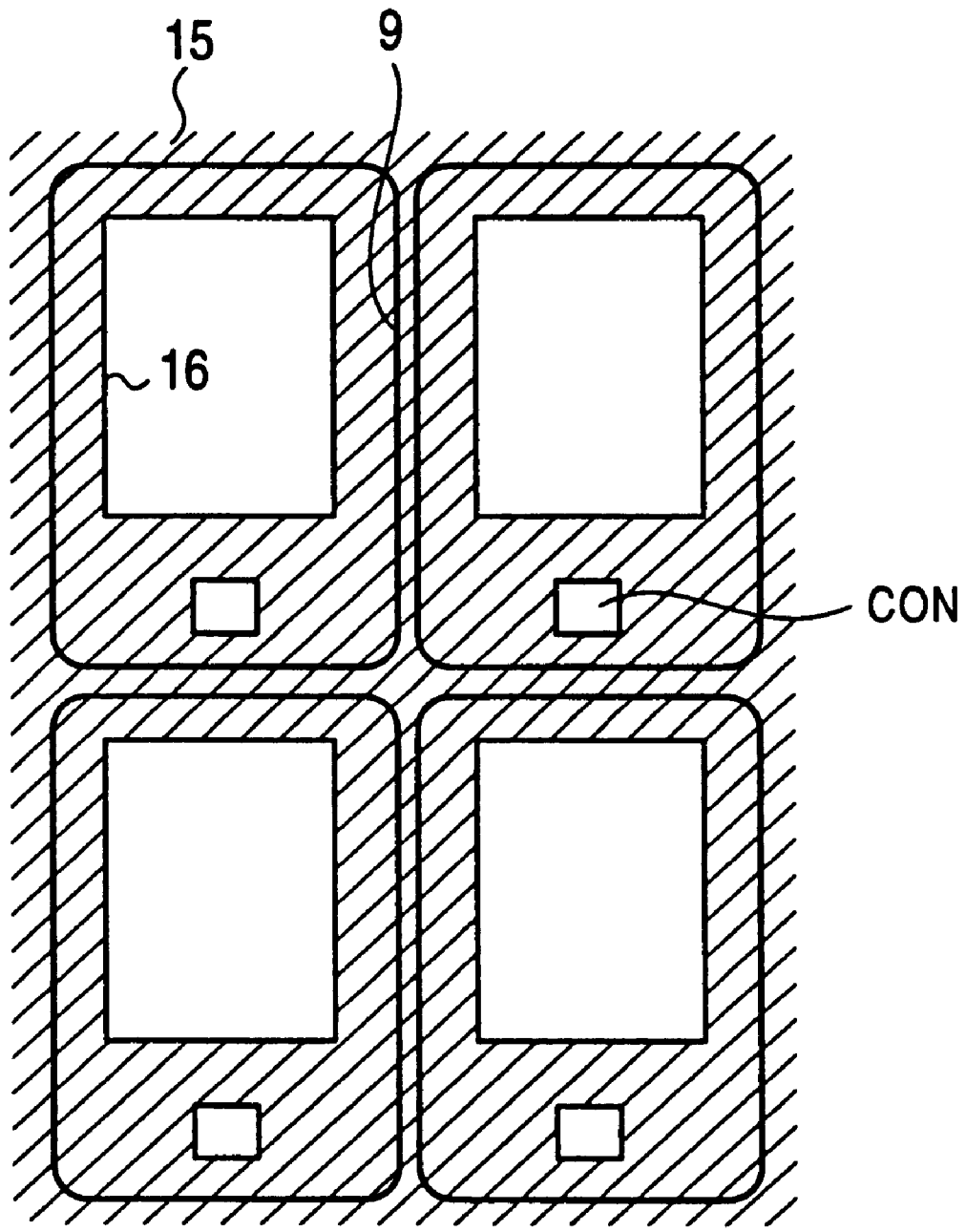
FIG. 6 is a schematic plan view of the conventional color display device shown in FIG. 5.
Figure 7:
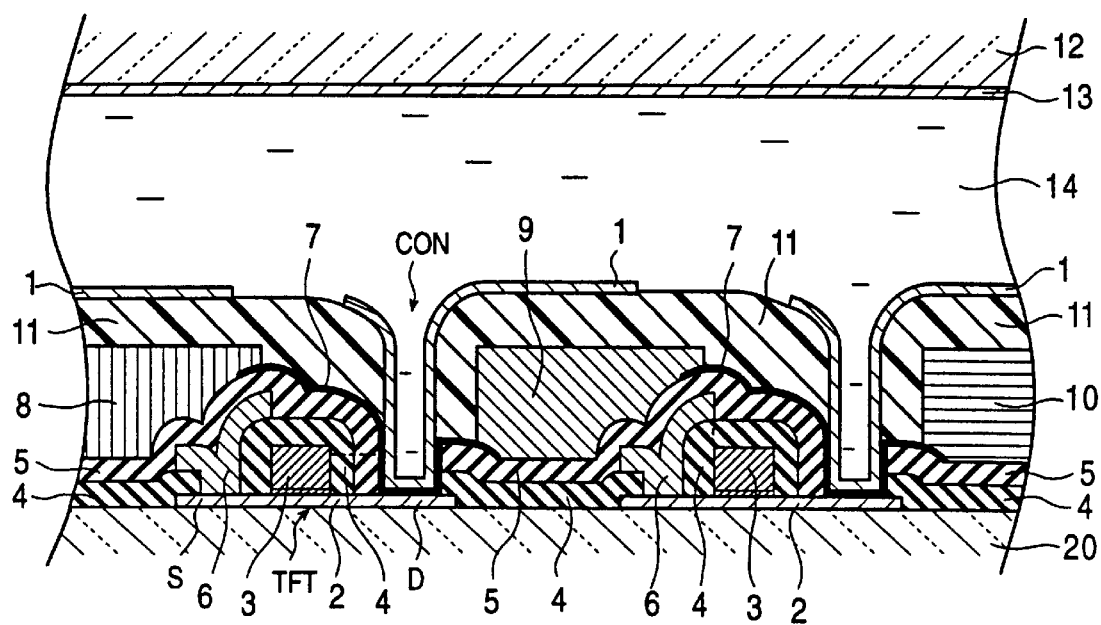
FIG. 7 is a schematic partial sectional view of an example of color display devices of prior applications.
Figure 8:
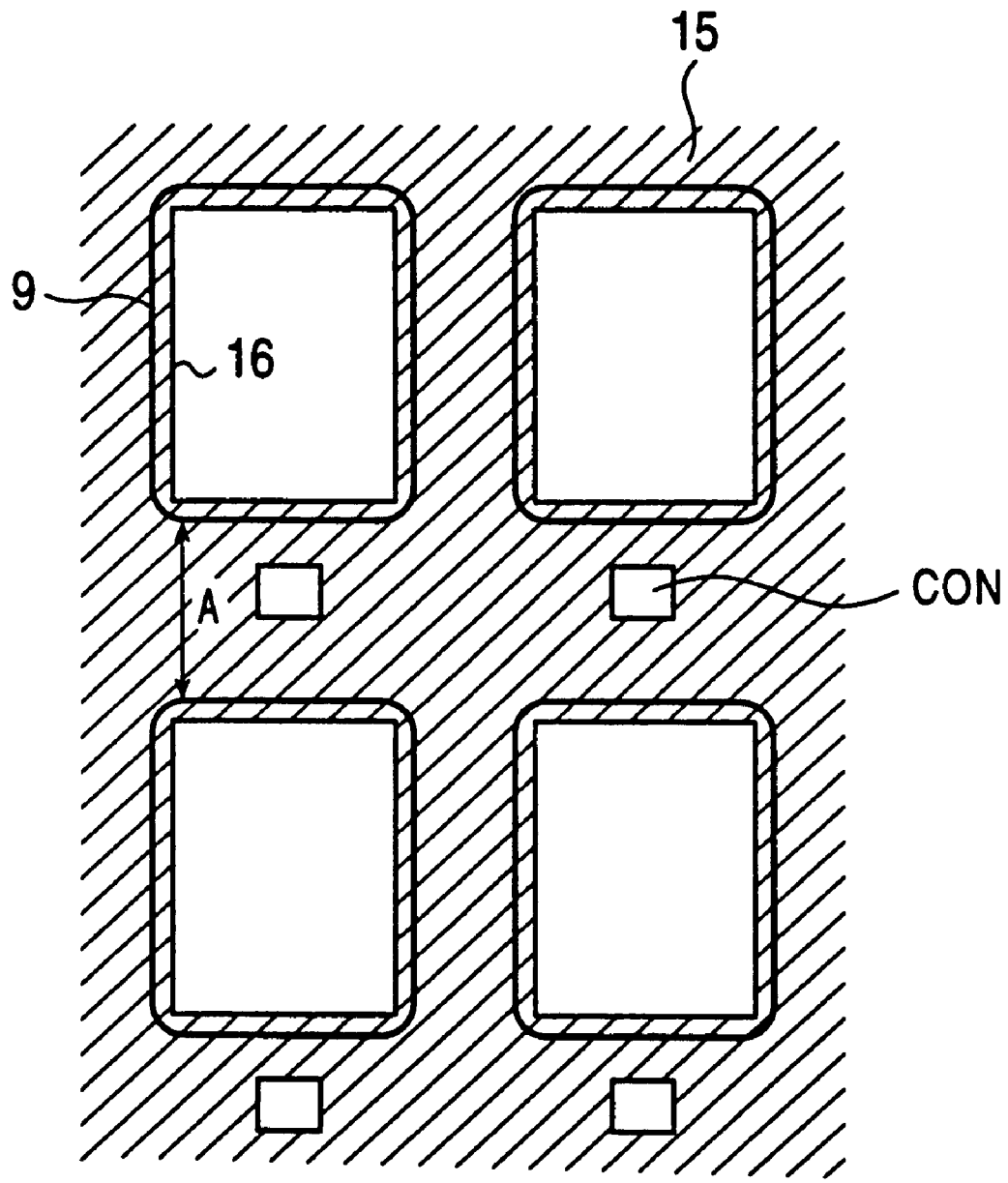
FIG. 8 is a schematic plan view of the example of conventional color display devices shown in FIG. 7.

FIG. 2 is a schematic plan view of the color display device of the first embodiment shown in FIG. 1. Namely, the color filters of the present invention shown in FIG. 2 comprise the normal color filter 9 (as an example) formed in alignment with the pixel apertures, and the dummy color filter 100 formed to fill the spaces A between the adjacent color filters in the longitudinal direction apart from the contact holes CON, which is the characteristic of the present invention. The dummy color filter 100 may be formed between the contact holes CON (for example, formed in a square shape between the contact holes). This prevents poor contact of the contact holes, and removes differences in height between the spaces between the color filters and the pixel electrodes 1, thereby obtaining the driving substrate 20 having excellent quality of liquid crystal alignment. The light shielding regions 15 and apertures 16 are shown, which correspond to the like numbered elements in FIG. 6.

Second Embodiment

Figure 3:
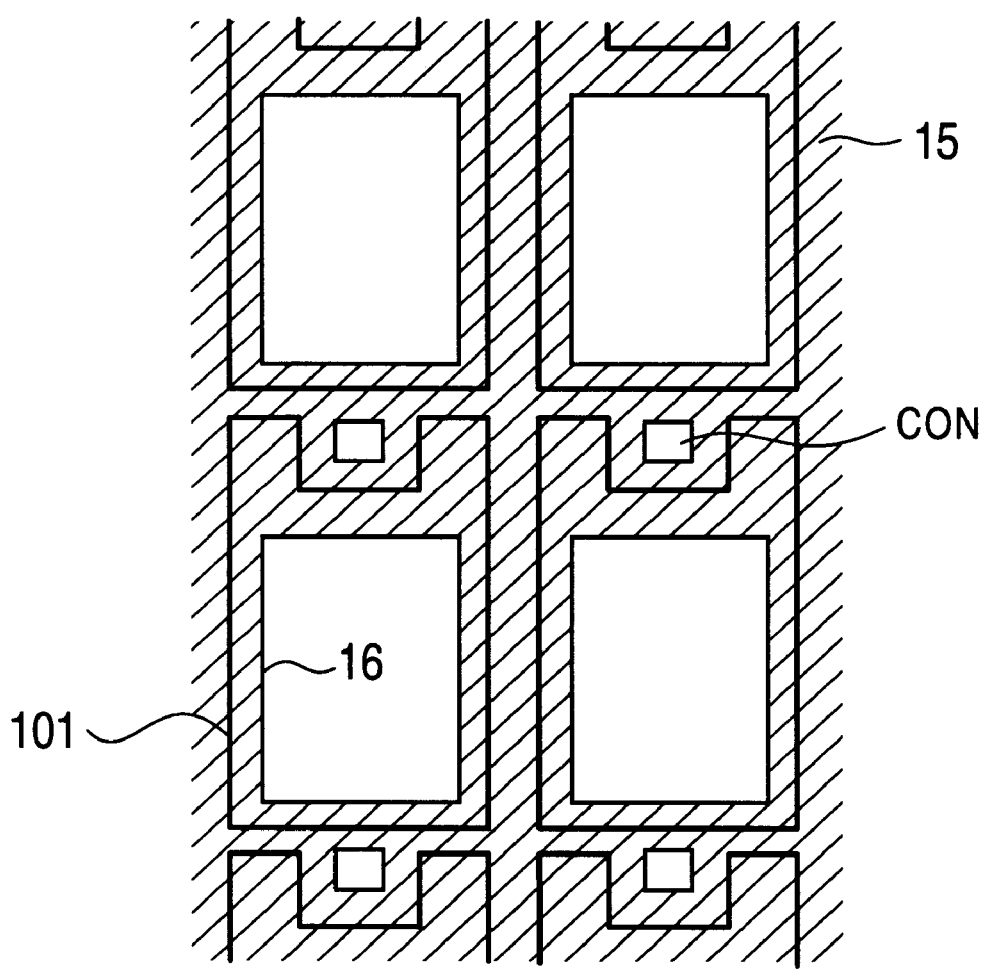
FIG. 3 is a schematic plan view of a color display device in accordance with a second embodiment of the invention.

A color display device in accordance with a second embodiment of the present invention is described. This embodiment uses projecting shape color filters in place of the dummy color filter formed in the first embodiment. This embodiment is described with reference to FIG. 3. FIG. 3 is a schematic plan view of a color display device of the second embodiment.

The color filter 101 of the present invention shown in FIG. 3 is formed on each of the pixel apertures 16 to project in a concave shape into the space between the adjacent color filters in the longitudinal direction thereof apart from the contact hole CON, which is a characteristic of the present invention. This prevents the occurrence of a gap between the adjacent color filters in the longitudinal direction thereof, thereby removing unevenness on the driving substrate 20 and providing a color display device having no disorder in liquid crystal alignment and capable of obtaining high image quality. Th other description is the same as the first embodiment, and is thus omitted.

Third Embodiment

In this embodiment, the present invention is applied to a delta arrangement color display device. This embodiment is described with reference to FIG. 4. FIG. 4 is a schematic plan view of a color display device in accordance with the third embodiment, in which FIG. 4A shows an example of concave color filters, and FIG. 4B shows an example of convex color filters.

Figure 4B:
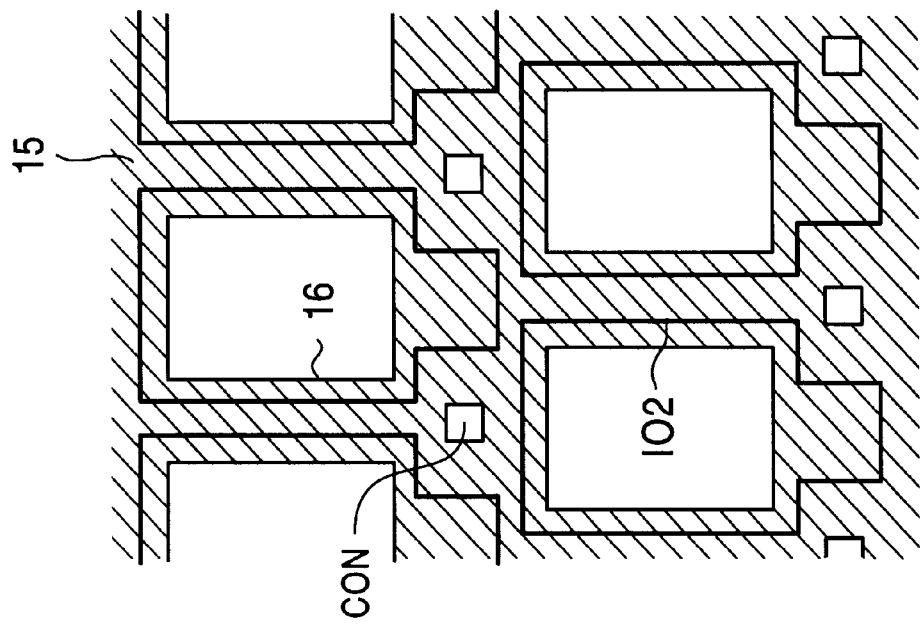
Figure 4A:
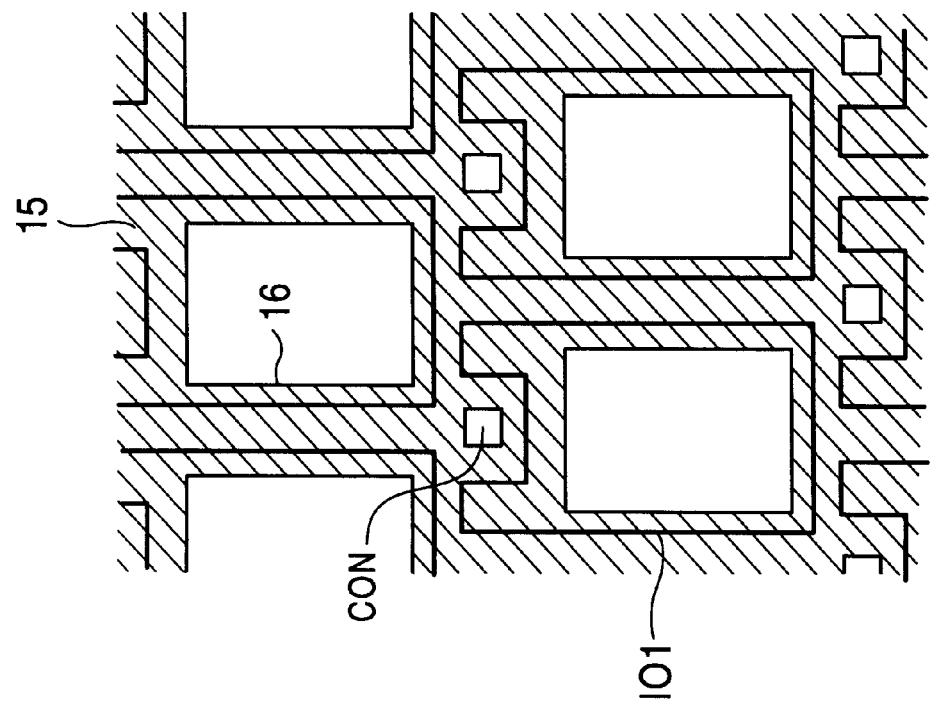
Figure 5:
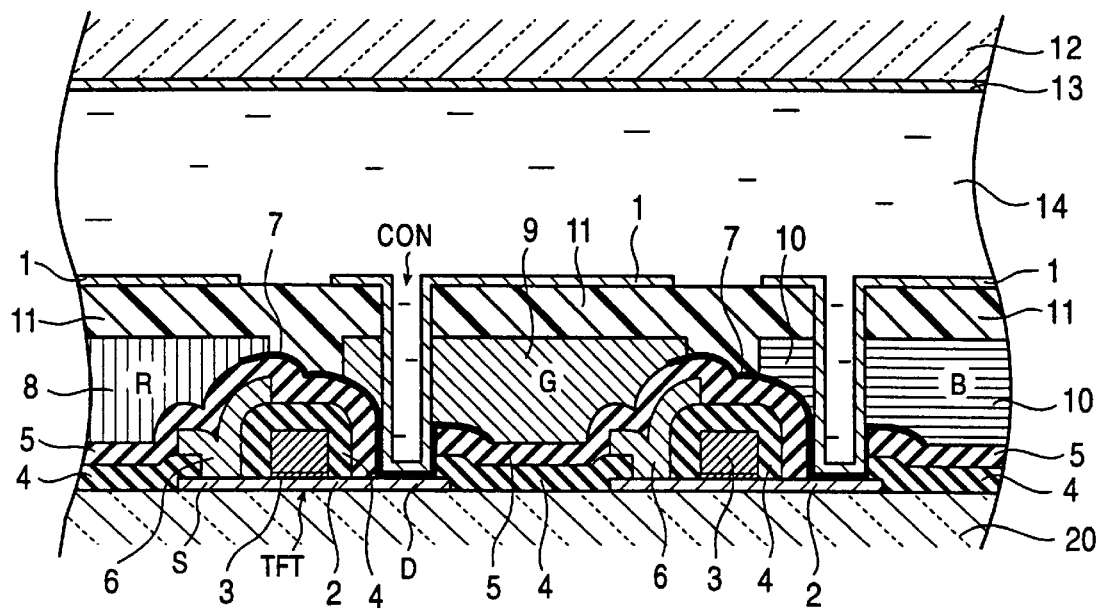
FIG. 5 is a schematic partial sectional view of an example of conventional color display devices.

The color filter 101 of the present invention shown in FIG. 4A is formed on each of the pixel apertures 16 formed in the delta arrangement to project in a concave shape into the space between the adjacent color filters apart from each of the contact holes formed in the delta arrangement in the same manner, to solve the problem of conventional color filters.

The color filter 102 of the present invention shown in FIG. 4B is formed on each of the pixel apertures 16 formed in the delta arrangement to project in a convex shape downward in the drawing into the space between the adjacent color filters apart from each of the contact holes formed in the delta arrangement, to solve the problem of conventional color filters.

After the color filter 101 or 102 shown in FIG. 4A or B is formed, the above-described planarization film (refer to FIG. 1) is formed (not necessary), and the pixel electrodes 1 are then formed. Therefore, the driving substrate 20 is planarized, and a color display device capable of obtaining good image quality can thus be provided. Repeated description is omitted.

The present invention is not limited to the above embodiments, and various embodiments can be made. For example, the planar shape of the color filters of the present invention is not limited to the concave and convex shapes, and any desired shapes can be employed. Of course, the present invention is not limited to any arrangement system such as a stripe arrangement, a delta arrangement, or the like, and any driving system, and various embodiments can be made.

As described above, in accordance with the present invention, the color display device has the on-chip color filter structure in which the dummy color filter is arranged apart from the apertures, or the color filters are formed in a planar shape in which an end thereof projects into a region apart from each of the apertures. As a result, the unevenness on the surface of the driving substrate in the sectional direction thereof can be removed, and a color display device having no disorder of liquid alignment and capable of forming high-quality images can be provided. Of course, in the on-chip color filter structure, the pixel region has a high aperture ratio, and the pixel electrodes and the color filters exhibit substantially no alignment error, thereby maintaining a high aperture ratio even if the pixel region is made fine, and causing the effect of improving the aperture ratio and transmittance of an active-matrix type color display device.

What is claimed is:

1. A color display device comprising:
    a first substrate having a plurality of pixel electrodes arranged in a matrix;
    switching elements respectively connected to the pixel electrodes;
    an insulating film arranged between the pixel electrodes and the switching elements and having contact holes for respectively connecting the pixel electrodes and the switching elements;
    color filters formed in alignment with the pixel electrodes on the first substrate;
    a dummy color filter formed in the space regions between the adjacent color filters in the plane thereof apart from the contact holes;
    a second substrate arranged opposite to the first substrate; and
    an electro-optical material sandwiched between the first and second substrates.

2. A color display device according to claim 1, wherein the insulating film comprises an interlayer insulating film made of an inorganic material and formed on the switching elements, and a planarization film formed between the interlayer insulating film and the pixel electrodes and made of an organic resin.

3. A color display device according to claim 2, further comprising a light shielding film formed on the interlayer insulating film to form a portion of a black matrix.

4. A color display device according to claim 1, wherein the color filters are composed of an organic photosensitive material containing a pigment dispersed therein.

5. A color display device comprising:
    a first substrate having a plurality of pixel electrodes arranged in a matrix;
    switching elements respectively connected to the pixel electrodes;
    an insulating film arranged between the pixel electrodes and the switching elements and having contact holes for respectively connecting the pixel electrodes and the switching elements;
    color filters formed in alignment with the pixel electrodes on the first substrate to project in either of concave and convex shapes into the spaces between the adjacent color filters apart from the contact holes;

a second substrate arranged opposite to the first substrate; and an electro-optical material sandwiched between the first and second substrates.

6. A color display device according to claim 5, wherein the insulating film comprises an interlayer insulating film made of an inorganic material and formed on the switching elements, and a planarization film formed between the interlayer insulating film and the pixel electrodes and made of an organic resin.

7. A color display device according to claim 6, further comprising a light shielding film formed on the interlayer insulating film to form a portion of a black matrix.

8. A color display device according to claim 5, wherein the color filters are composed of an organic photosensitive material containing a pigment dispersed therein.

* * * * *